(12) United States Patent
Miller et al.

(10) Patent No.: US 8,726,950 B2
(45) Date of Patent: May 20, 2014

(54) MIS-FUEL INHIBITOR

(75) Inventors: Bryan M. Miller, Elk Grove, IL (US); Franco A. Cisternino, Deerfield, IL (US); Paul M. Sutenbach, Highland Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 634 days.

(21) Appl. No.: 13/057,049

(22) PCT Filed: Aug. 3, 2009

(86) PCT No.: PCT/US2009/052561
§ 371 (c)(1),
(2), (4) Date: Feb. 1, 2011

(87) PCT Pub. No.: WO2010/021829
PCT Pub. Date: Feb. 25, 2010

(65) Prior Publication Data
US 2011/0132906 A1 Jun. 9, 2011

Related U.S. Application Data

(60) Provisional application No. 61/090,411, filed on Aug. 20, 2008.

(51) Int. Cl.
*B65B 1/04* (2006.01)
*B60K 15/04* (2006.01)

(52) U.S. Cl.
CPC ......... *B60K 15/04* (2013.01); *B60K 2015/0483* (2013.01)
USPC ........ 141/350; 141/348; 141/349; 141/311 R; 141/312; 220/86.2

(58) Field of Classification Search
CPC .............................................. B60K 2015/0483
USPC .............. 141/311 R, 312, 348–350; 220/86.2
See application file for complete search history.

(56) References Cited

U.S. PATENT DOCUMENTS

| | | |
|---|---|---|
| 6,539,990 B1 | 4/2003 | Levey et al. |
| 6,923,224 B1 | 8/2005 | McClung et al. |
| 6,983,773 B1 * | 1/2006 | Hagano et al. ................ 141/350 |
| 7,077,178 B2 | 7/2006 | Hedevang |
| 7,293,586 B2 | 11/2007 | Groom et al. |
| 7,302,977 B2 | 12/2007 | King et al. |
| 7,661,550 B2 * | 2/2010 | Feichtinger .................. 220/86.2 |
| 7,950,425 B2 | 5/2011 | Och |
| 7,967,041 B2 * | 6/2011 | Groom et al. ................. 141/367 |
| 7,967,042 B2 * | 6/2011 | Groom et al. ................. 141/350 |
| 8,191,588 B2 * | 6/2012 | Hagano .......................... 141/350 |
| 2009/0095373 A1 * | 4/2009 | Correira et al. ............... 141/350 |

(Continued)

OTHER PUBLICATIONS

ISR and Written Opinion for PCT/US2009/052561.

*Primary Examiner* — Timothy L Maust
*Assistant Examiner* — Robert Bell III
(74) *Attorney, Agent, or Firm* — Mark W. Croll; Paul F. Donovan (57) ABSTRACT

A mis-fuel inhibitor in an inlet neck assembly of a vehicle fuel system discriminates between nozzle diameters, allowing entrance of nozzle diameters at or greater than a predetermined minimum diameter while inhibiting entrance of nozzles having diameters less than the predetermined minimum diameter. An actuator responsive to nozzle diameters opens and closes shutters blocking nozzle entrance.

20 Claims, 8 Drawing Sheets

(56) References Cited

U.S. PATENT DOCUMENTS

2010/0132838 A1* 6/2010 Cisternino et al. ............ 141/349
2010/0218849 A1* 9/2010 Hagano ......................... 141/350
2011/0139779 A1* 6/2011 Muller .......................... 220/86.2
2012/0211489 A1* 8/2012 Walser et al. ................. 220/86.2
2012/0279612 A1* 11/2012 Washio et al. ................ 141/350

* cited by examiner

MIS-FUEL INHIBITOR

CROSS-REFERENCE TO RELATED APPLICATIONS

The present application is National Phase of International Application Number PCT/US2009/052561, filed Aug. 3, 2009, and claims benefits to U.S. Provisional Application Ser.No. 61/090,411, filed on Aug. 20, 2008.

FIELD OF THE INVENTION

The present invention relates generally to vehicle fuel systems and the refueling structures thereof provided to receive fuel into the vehicle fuel system. More particularly the invention relates to vehicle fuel system inlet neck assemblies having inlet openings with diameters that are larger than the nozzle diameters of refueling systems for dispensing fuels of types other than the fuel intended for the vehicle, and still more particularly to structures for preventing mis-fueling a vehicle fuel system with unintended fuels.

BACKGROUND OF THE INVENTION

It is known to provide refueling system nozzles of different sizes so that an individual operating the refueling system can be aware of the type of fuel that will be dispensed from the system, and to prevent the inadvertent deposit of a wrong fuel, such as diesel fuel, into some vehicles, such as gasoline powered automobiles. It is known, for example, to provide nozzles for dispensing diesel fuel of a larger diameter than the nozzles for dispensing gasoline or urea. Accordingly, an individual cannot inadvertently dispense diesel fuel from a diesel fuel refueling system into an automobile fuel system requiring gasoline in that an inlet opening at the inlet end of the automobile fuel system will have an opening smaller than the diameter of a diesel fuel dispensing nozzle.

By way of further example, a urea dispensing nozzle commonly has a diameter of 19 mm and a gasoline dispensing nozzle commonly has a diameter of 21 mm. Vehicle fuel systems intended to receive such fuels are provided with fuel system inlet openings only minimally larger than the dispensing nozzle diameter for the fuel intended. Diameters for diesel fuel refueling system dispensing nozzles intended for passenger cars and light trucks are generally between 23.6 mm and 25.5 mm, while high flow rate diesel fuel dispensing nozzles intended for heavy-duty trucks are provided in diameters of 28.5 mm to 38 mm to enable faster dispensing of larger fuel volumes. Again, the inlet openings of vehicle fuel systems intended to be refueled with diesel fuel are provided with opening diameters only minimally larger than the dispensing nozzle diameter from which it is intended to be refueled.

Accordingly, it can be appreciated that the nozzle for diesel fuel dispensing systems generally will not fit into the refueling inlet openings of gasoline or urea fuel systems, and it is therefore unlikely that a fuel system requiring gasoline or urea will be refueled inadvertently with diesel fuel. However, because of the larger diameters at the refueling inlet openings of diesel fuel systems, a vehicle requiring diesel fuel can be refueled inadvertently from a refueling system having a urea dispensing nozzle or a gasoline dispensing nozzle. Refueling with improper fuel can cause damage to fuel systems and engines and therefore must be avoided.

Some nozzle inhibiting structures are known, and can prevent a smaller nozzle from a gasoline or urea refueling system from being inserted into a refueling inlet opening for a diesel fuel system. However, some such known structures are overly complex, complicating assembly, installation or retrofitting on existing systems; as well as compromising performance reliability under some situations. Some are not completely reliable, and can be forced to admit a smaller nozzle through excessive or angular force applied when trying to insert a smaller nozzle. Accordingly a simple yet reliable structure for inhibiting inadvertent mis-fueling of diesel fuel systems is desirable.

SUMMARY OF THE INVENTION

A mis-fuel inhibitor assembly includes a removable blocking structure in front of the primary shutoff valve flapper door in the inlet neck assembly of a vehicle fuel system. The blocking structure prevents a nozzle from reaching the flapper door and opening the flapper door. An actuator adjusts a position of the blocking structure to allow passage of a refueling nozzle to the flapper door. The actuator is responsive only to nozzles of a specified diameter or larger, so that nozzles having diameters smaller than the standard nozzle for the intended fuel do not initiate the actuator to adjust the blocking structure, and a smaller nozzle is inhibited from accessing the flapper door.

In one aspect of one form thereof, the present invention provides a vehicle fuel system inlet inhibitor for limiting fuel nozzle access by nozzle diameter. The inhibitor has a fuel inlet path defined by a plurality of openings; first and second shutters at one of the openings having closed positions blocking passage of a refueling nozzle through the opening and opened positions allowing entrance of the refueling nozzle through the openings. An actuator is connected to the shutters for opening and closing the shutters together, the actuator being initiated to open the shutters upon insertion of a nozzle having a diameter of at least a predetermined minimum diameter In another aspect of another form thereof, the present invention provides a vehicle fuel system inlet neck assembly with an inhibitor for limiting fuel nozzle access by nozzle diameter and having an inlet path defined by a plurality of openings; and a primary shutoff valve having an access hole positioned with respect to the inhibitor to receive a refueling nozzle inserted along the inlet path, and a flapper door closing the access hole. The inhibitor includes an actuator having peripherally connected segments defining one of the openings having a diameter smaller than a minimum acceptable nozzle diameter. Adjacent segments of one pair are separated by an axial separation extending through the actuator from the opening defined by the actuator segments. The opening expands under force exerted by insertion of a nozzle of at least the minimum acceptable diameter. Expansion of the opening causes movement of at least some of the segments. The actuator has first and second pins axially directed from the actuator toward the primary shutoff valve, the pins being disposed on segments that are moved by expansion of the opening. An inner plate has lateral guide slots through which the first and second pins extend. First and second shutters are disposed on an opposite side of the inner plate from the actuator and block access to the flapper door in closed positions of the shutters and expose the flapper door in opened positions of the shutters. Cam slots in the first and second shutters receive distal end portions of the first and second pins.

In a still further aspect of a still further form thereof, the present invention provides a vehicle fuel system refueling inlet inhibitor for limiting fuel nozzle access by nozzle diameter. The inhibitor includes an actuator having peripherally connected segments defining an opening with a diameter smaller than a minimum acceptable nozzle diameter and larger than a maximum unacceptable nozzle diameter. Segments of one pair are separated by an axial separation extending through the actuator from the opening. The opening expands under force exerted by insertion of a nozzle of at least the minimum acceptable diameter and causes movement of at least some of the segments. First and second pins extend from segments that are moved by expansion of the opening. An inner plate has lateral guide slots through which the first and second pins extend. First and second shutters are on an opposite side of the inner plate from the actuator, and have closed positions adjacent each other and opened positions in which the shutters are swung away from each other. Cam slots in the first and second shutters receive distal end portions of the first and second pins.

One advantage of one form of the present invention is that a mis-fuel inhibitor can be added to an inlet neck assembly of a motor vehicle fuel system to minimize the opportunities for refueling the vehicle with improper fuel.

Another advantage of another form of the present invention is that a refueling pump nozzle smaller than an intended refueling nozzle size can be restricted from entering a vehicle fuel system during a refueling operation.

Still another advantage of still another form of the invention is that common nozzle sizes for gasoline and urea refueling pumps can be inhibited from entering a diesel fuel system inlet neck assembly so that the possibility of refueling a diesel fuel system with gasoline or urea is reduced.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
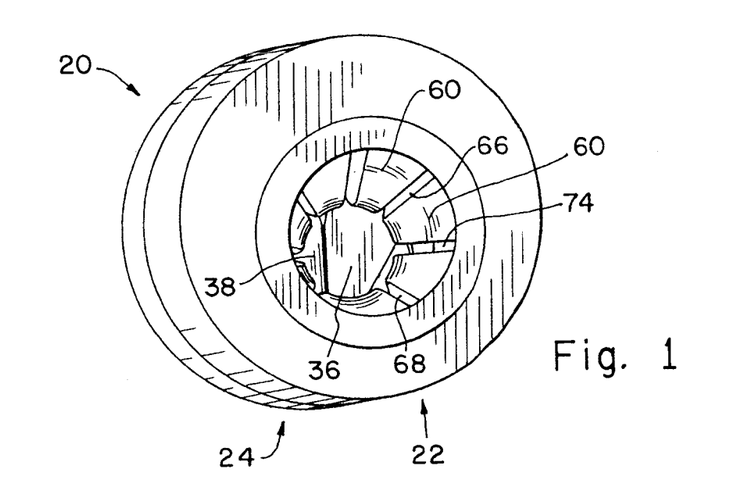
FIG. 1 is a perspective view of a vehicle fuel system inlet neck assembly having a mis-fuel inhibitor therein.
Figure 2:
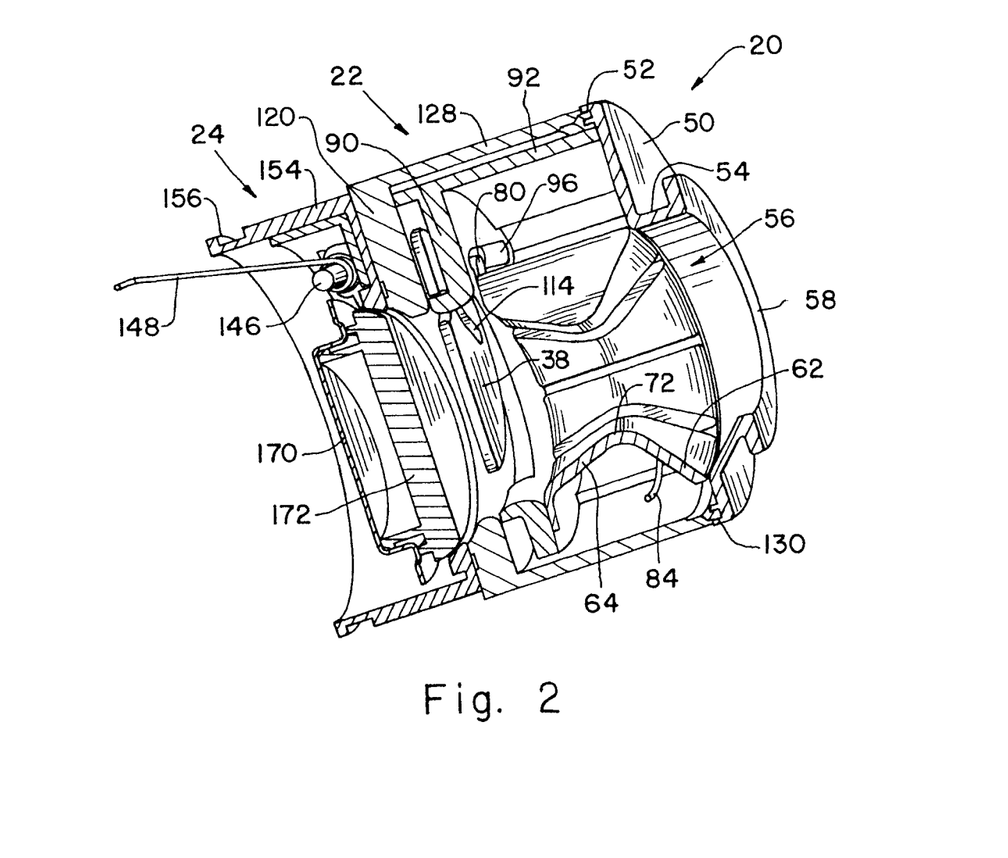
FIG. 2 is a cross-sectional view of the fuel system inlet neck assembly shown in FIG. 1.
Figure 3:
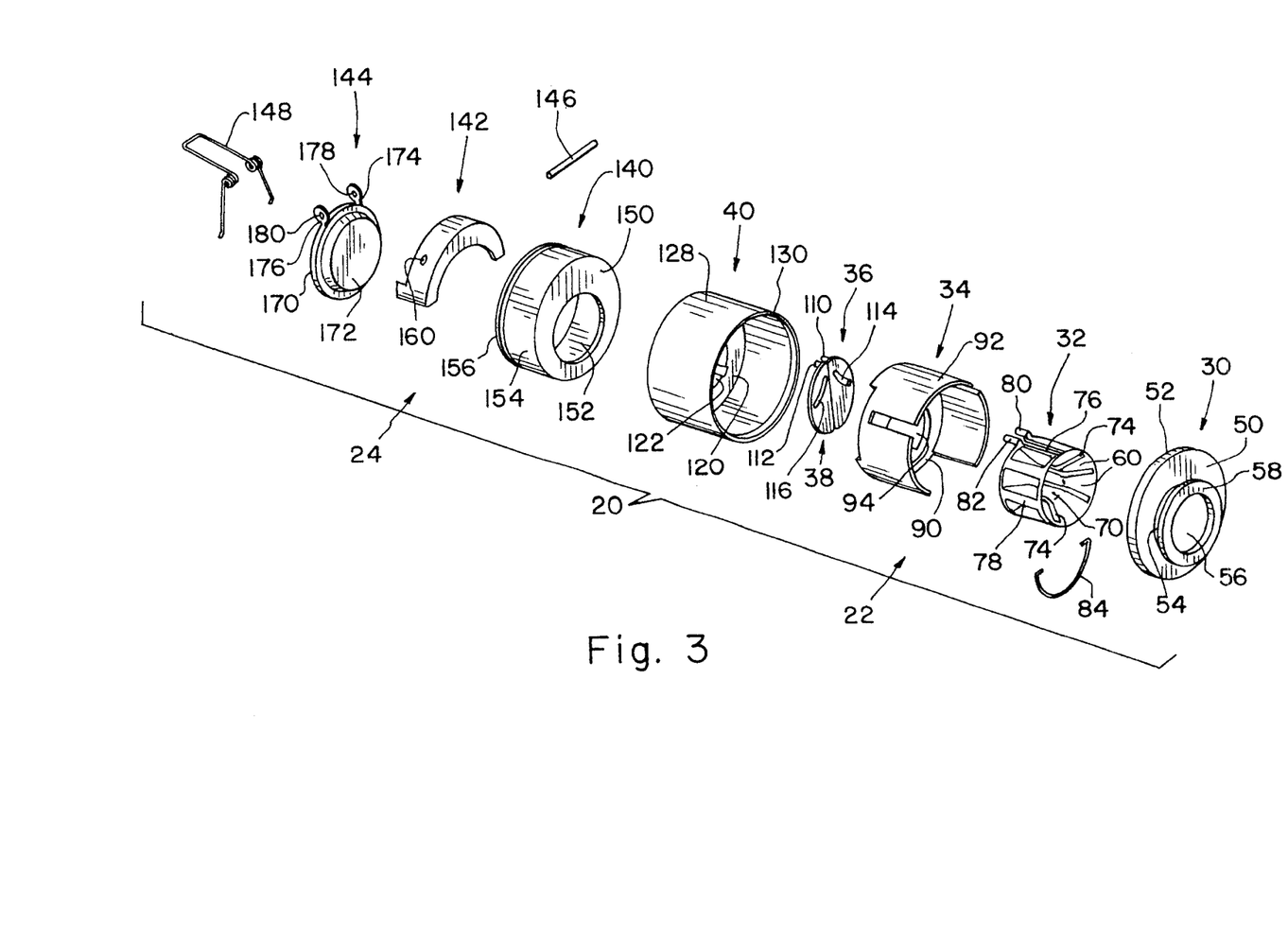
FIG. 3 is an exploded view of the inlet neck assembly shown in FIGS. 1 and 2.
Figure 4:
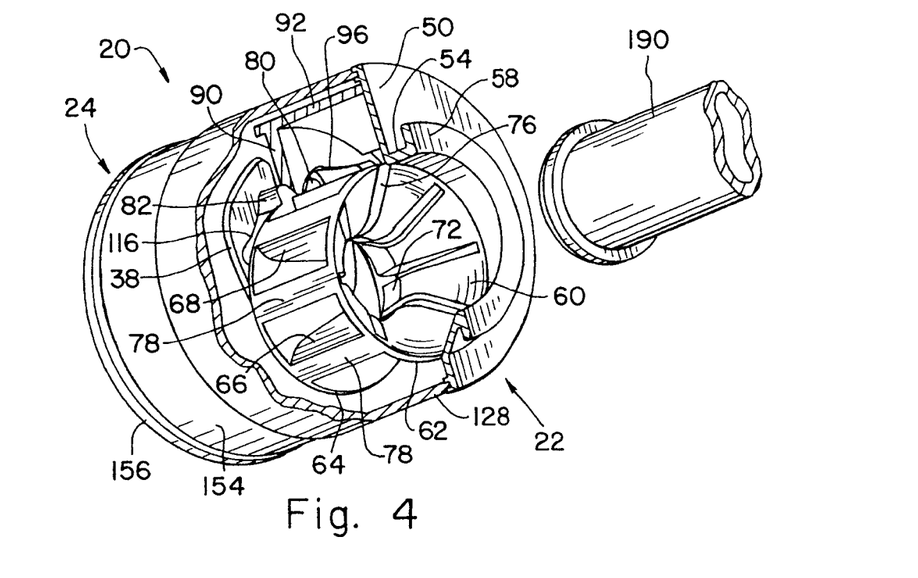
FIG. 4 is a fragmentary perspective view of the inlet neck assembly shown in the previous drawings, illustrating a condition prior to refueling.
Figure 5:
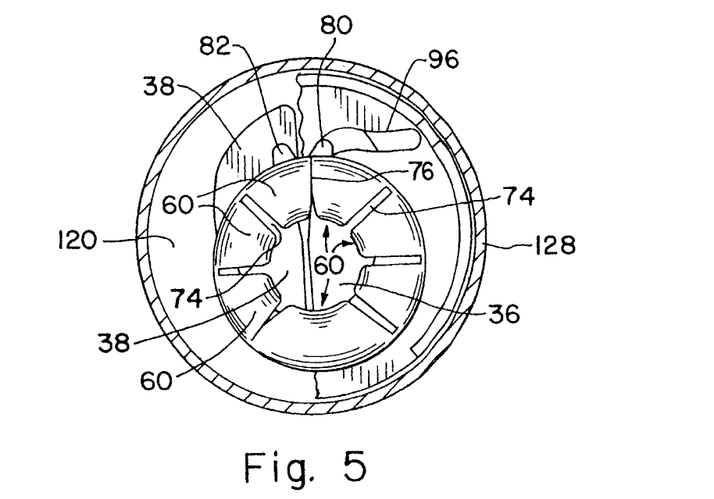
FIG. 5 is an end view, partially broken away, of the inlet neck assembly in the condition shown in FIG. 4.

Referring now more specifically to the drawings and to FIGS. 1 and 2 in particular, a vehicle fuel system inlet neck assembly 20 is shown having a mis-fuel inhibitor 22 as a part thereof for preventing the insertion of a refueling nozzle that is smaller in diameter than the nozzles provided for the intended fuel. Refueling system 20 is shown as a capless refueling system having a primary shutoff valve 24; however, those skilled in the art will readily recognize that mis-fuel inhibitor 22 can be incorporated into the inlet neck of a vehicle fuel system having an outer cap thereon as well. The capless structure shown is merely one suitable arrangement in which the mis-fuel inhibitor can be used advantageously, but is not intended to limit applications and uses of the present invention, nor the scope of the claims that follow.

Mis-fuel inhibitor 22 includes an outer cover 30, an actuator 32, an actuator inner housing 34, first and second shutters 36, 38 and an actuator outer housing 40. Actuator outer housing 40 and outer cover 30 define an inner volume in which actuator inner housing 34 is contained, with actuator 32 positioned therein and first and second shutters 36, 38 disposed between actuator inner housing 34 and actuator outer housing 40. A path is defined along openings through the assembled components for insertion of a properly sized nozzle to reach primary shutoff valve 24. As those skilled in the art will readily understand, various locating features including cooperating ribs, grooves, projections, holes and the like can be used on adjacent components for properly locating and positioning the various components with respect to one another.

More specifically, outer cover 30 includes a top 50 defining a circumferential channel 52 at the outer edge thereof and an upstanding ring 54 defining an opening 56 therethrough. A flange 58 at the outer edge of ring 54 provides stability and strength. Ring 54 can be shaped and sloped with respect to the angle at which inhibitor 22 is positioned to direct a refueling nozzle inserted therein.

Figure 12:
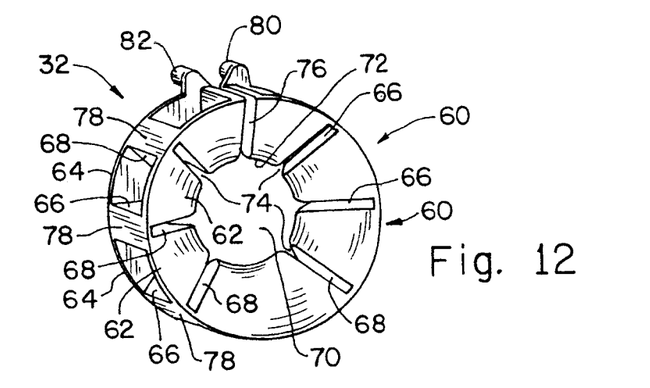
FIG. 12 is a perspective view of an actuator in the mis-fuel inhibitor shown in the previous drawings.

Actuator 32, shown individually in FIG. 12, is a generally annular, expandable structure of connected, partially enclosed, truncated pyramid-shaped segments 60, with open bases thereof at the circumferential periphery of actuator 32. As can be seen in FIGS. 2 and 12, each of the truncated pyramid-shaped segments 60 has an outer end panel 62 and an inner end panel 64 between radial panels 66 and 68. Segments 60 taper inwardly both radially and axially, and together segments 60 define a narrowed opening 70 at rounded truncated apexes 72 of the segments 60. Narrowed opening 70 defines an expandable passage through actuator 32. In a relaxed state of the installed actuator 32, opening 70 is of smaller diameter than the diameter of the smallest acceptable refueling nozzle to be received in mis-fuel inhibitor 22 and is larger than the diameter of the refueling nozzles for unacceptable fuels that are to be prevented from completely entering inlet neck assembly 20. Outwardly closed radial spaces 74 are provided between adjacent segments 60 except for between one pair of adjacent segments 60 that are separated by a complete axial separation 76. Outwardly closed radial spaces 74 terminate at connecting panels 78 provided at the outer periphery of actuator 32 to interconnect adjacent segments 60 at the open bases thereof. Accordingly, actuator 32 can be expanded and contracted, increasing or decreasing the width of axial separation 76 while changing the shapes of radial spaces 74 slightly. Pins 80, 82 are provided axially directed from the peripheral edge of the inwardly face end of actuator 32, extending toward primary shutoff valve 24, one such pin 80, 82 provided on each side of axial separation 76. Accordingly, expansion of opening 70 and the resulting broadening of axial separation 76 cause pins 80, 82 to move away from one another. A C-shaped spring 84 is connected to and partially surrounds actuator 32, and biases actuator 32 to a constricted position with separation 76 substantially closed in the relaxed state of the installed actuator 32. Accordingly, insertion of a nozzle having a diameter greater than narrowed opening 70 requires sufficient force to overcome the biasing spring force of C-shaped spring 84; and, upon removal of such a nozzle, actuator 32 constricts under the biasing force of C-shaped pin 32.

Figure 13:
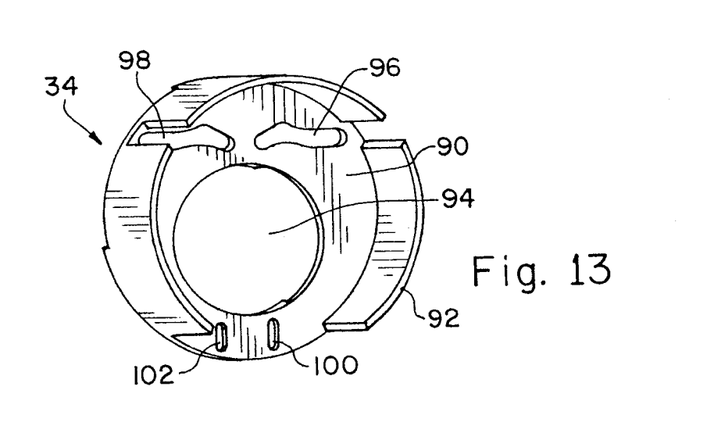
FIG. 13 is a perspective view of an actuator inner housing in the mis-fuel inhibitor shown in the previous drawings.

Inner housing 34, shown individually in FIG. 13, is a generally cup-like structure having an inner plate 90 and a sidewall 92. Inner plate 90 defines a major opening 94 for receiving a nozzle therethrough and lateral guide slots or channels 96, 98 for receiving pins 80, 82 of actuator 32. Sidewall 92 can be substantially continuous or discontinuous as necessary and advantageous for operation of components contained therein in a compact assembly. One or more holes 100, 102 in inner plate 90 can be provided for receiving on or more locating projections of actuator 32.

First and second shutters 36, 38 are pivotally installed leaf-like structures forming a barrier to the insertion of a nozzle through mis-fuel inhibitor 22. At ends thereof, which in the exemplary embodiment are upper ends, first and second shutters 36, 38 have axially inwardly extending pivot projections 110, 112, respectively. Each further defines a cam slot 114, 116, respectively, angling downwardly and outwardly from upper positions near the pivot projections. Cam slots 114, 116 receive therein distal end portions of axially extending pins 80, 82 of actuator 32. Accordingly, movement of axially extending pins 80, 82 caused by the outward expansion of actuator 32 as a refueling nozzle is inserted causes movement of the pins relative to cam slots 114, 116, and results in shutters 36, 38 pivoting about the pivotal projections 110, 112 thereof from the closed positions in which the shutters are adjacent one another to opened positions in which the shutters are swung away from each other.

Figure 14:
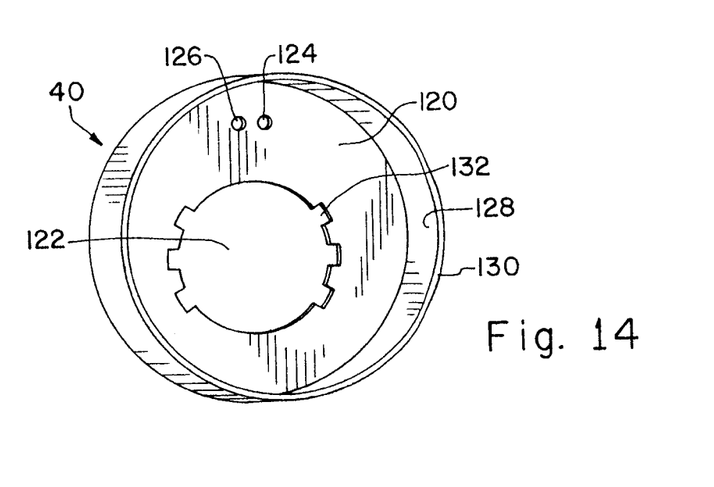
FIG. 14 is a perspective view of an actuator outer housing in the mis-fuel inhibitor shown in the previous drawings.

Actuator outer housing 40, shown individually in FIG. 14, is a further cuplike structure having a base 120 at the inner end thereof, defining an opening 122 therethrough. Opening 122 is oriented with respect to opening 94 of inner housing 34, opening 70 of actuator 32 and opening 56 of outer cover 30 so as to receive a refueling nozzle inserted along the path defined by the openings. Base 120 further defines holes 124, 126 that receive axially extending pivot projections 110, 112 of shutters 36, 38, respectively; with shutters 36, 38 positioned between base 120 of actuator outer housing 40 and inner plate 90 of actuator inner housing 34. Actuator outer housing 40 further defines a sidewall 128 having an outer edge 130 received in circumferential channel 52 of cover 30. One or more lateral opening 132 can be used to define an exit path for fuel in the event of a failed nozzle shutoff when refueling is complete.

Mis-fuel inhibitor 20 is aligned with primary shutoff valve 24, which includes a flapper door housing 140, a flapper door bracket 142 with a flapper door 144 connected thereto by a pivot pin 146, and a flapper door spring 148 for biasing flapper door 144 to a closed position. During a refueling operation, a refueling nozzle is admitted by force exerted against flapper door 144 moving the flapper door out of the way for final entry of the refueling nozzle.

Flapper door housing 140 includes an outer plate 150 defining an access hole 152 therein for receiving a refueling nozzle during a refueling operation. Flapper door housing 140 further includes a sidewall 154 configured such as at a circumferential inner edge 156 for engaging a filler neck from a fuel tank of a vehicle fuel system.

Figure 15:
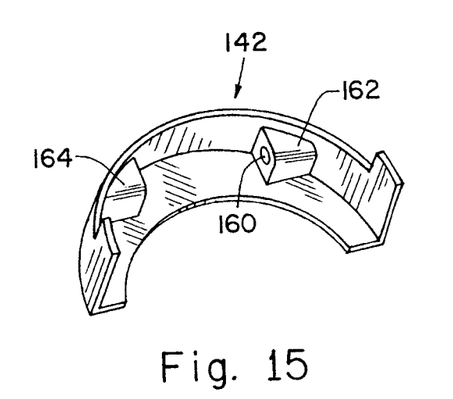
FIG. 15 is a perspective view of a flapper door bracket of a primary shutoff valve in the inlet neck assembly shown in the previous drawings.

Flapper door bracket 142, shown individually in FIG. 15, is anchored in flapper door housing 140 and provides a pivot anchor structure for flapper door 144. Accordingly, the ends of pin 146 are received in holes 160 of anchor blocks 162, 164.

Flapper door 144 includes a base structure 170 having a dome 172 thereon that is received in and/or against access hole 152 to close the opening therethrough. Pivot tabs 174, 176 define holes 178, 180 therein, respectively, and are secured about pivot pin 146.

Chamfered and/or angular surfaces are provided throughout the assembly to facilitate and direct the insertion of a refueling nozzle. Some of these chamfered and/or angled surfaces are illustrated at 182, 184 and 186 in the drawings.

As can be appreciated from the description above in conjunction with the various drawings showing different stages of a nozzle 190 being inserted, first and second shutters 36, 38 initially block access to flapper door 144, as shown in FIGS. 1, 2, 4 and 5. Axial force against shutters 36, 38 does not move the shutters from the closed, block positions of the installed assembly. Upon the insertion of a nozzle 190 of at least the minimum acceptable diameter, shutters 36, 38 are pivoted by actuator 32 about the pivot projections 110, 112 thereof to rotate the bodies of shutters 36, 38 from in front of flapper door 144. Rotation of shutters 36, 38 is caused by the expansion of actuator 32 and the resulting movement of actuator pins 80, 82 in cam slots 114, 116.

A refueling nozzle having a diameter smaller than the diameter required to expand actuator 32 simply passes through opening 56 and narrowed opening 70 without moving segments 60. The nozzle can continue through major opening 94 of inner housing 34 but then encounters first and second shutters 36, 38 which have not been moved and remain in a blocking position relative to opening 122 and structures there beyond, including flapper door dome 172. The nozzle cannot progress beyond this point and it never reaches primary shutoff valve 24. Attempts to force the end of the nozzle against shutters 36, 38 will not move the shutters, which must rotate about their pivot projections 110, 112 to be moved. Further, the relationships between actuator pins 80, 82; lateral guide slots 96, 98 and cam slots 114, 116 require that all moving parts be moved together; and C-shaped spring 84 holds the actuator in a constricted position with actuator pins 80, 82 closely positioned one to another. Accordingly, if actuator 32 is constructed so that narrowed opening 70 requires expansion to admit a diesel fuel nozzle but not for admitting narrower nozzles typically provided for gasoline or urea refueling systems, the narrower nozzles can not be inserted beyond first and second shutters 36, 38. The primary shutoff valve 24 remains closed, and inappropriate fuel is not admitted to the fuel system.

As illustrated in the series of drawings including FIGS. 6-10, if a nozzle of larger diameter, such as diesel fuel nozzle 190 is inserted through opening 56 in outer cover 30, the end of the nozzle will encounter outer panels 62 of segments 60 in actuator 32. Since the nozzle 190 is of a diameter larger than narrowed opening 70, force is applied against segments 60 as the nozzle, is pushed inwardly. The tapering orientation of the outer panels 62 facilitates insertion of the nozzle being forced there against and initiation of actuator 32 by the outward movement of the segments 60. Force applied against segments 60 and the resulting outward movement of the segments causes separation of the confronting edges along axial separation 76. Accordingly, pins 80 and 82 are caused to move away from one another. Anchoring some of the segments 60 diametrically opposite to axial separation 76 by locating pins received in holes 100, 102 minimizes movement of the anchored segments and focuses the expansion of actuator 32 and segment movement to the segments most closely adjacent to axial separation 76. Accordingly, a relatively small increase in the diameter of narrowed opening 70 results in appreciable movement of actuator pins 80, 82. The relative sizes, positions and orientations of the segments 60 with respect to one another also can be used to achieve the desired movement of actuator pins 80, 82. As shown in the exemplary embodiment in the drawings, not all segments 60 need be of the same size.

As narrowed opening 70 is caused to expand under the force from nozzle 190 being inserted, actuator pins 80, 82 move laterally within lateral guide slots or channels 96, 98. Pins 80, 82 also move along cam slots 114, 116 of first and second shutters 36, 38. As pins 80, 82 move along cam slots 114, 116, the angular orientation of cam slots 114, 160 causes a swinging type movement of shutters 36, 38 about the pivots defined by pivot projections 110, 112 pivotally held in holes 124, 126 of actuator outer housing 40. The swinging movement of first and second shutters 36, 38 exposes flapper door 144 to the continued inward advancement of nozzle 190 which, after passing through and expanding actuator 32 continues through the expanded opening in the actuator, major opening 94 of actuator inner housing 34 and between the outwardly swung first and second shutters 36, 38. The end of nozzle 190 passes through opening 122 of actuator outer housing 40 and encounters flapper door 144. Continued insertion of nozzle 190 applies force against flapper door 144, causing the flapper door to pivot about the axis defined by pivot pin 146. With the nozzle fully inserted into primary shutoff valve 22, refueling can commence.

Figure 6:
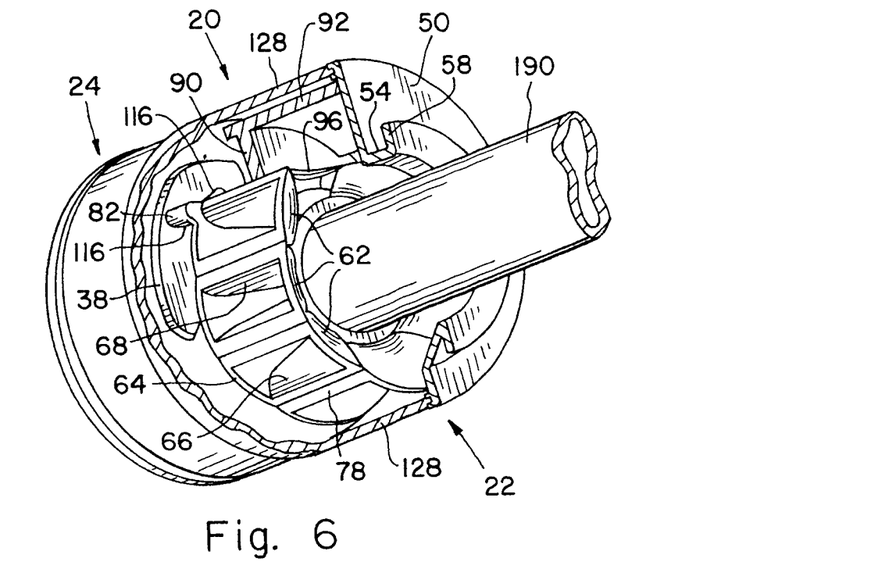
FIG. 6 is a fragmentary perspective view of the inlet neck assembly shown in the previous drawings, illustrating a condition as a refueling operation is commenced by initial insertion of a refueling nozzle.
Figure 7:
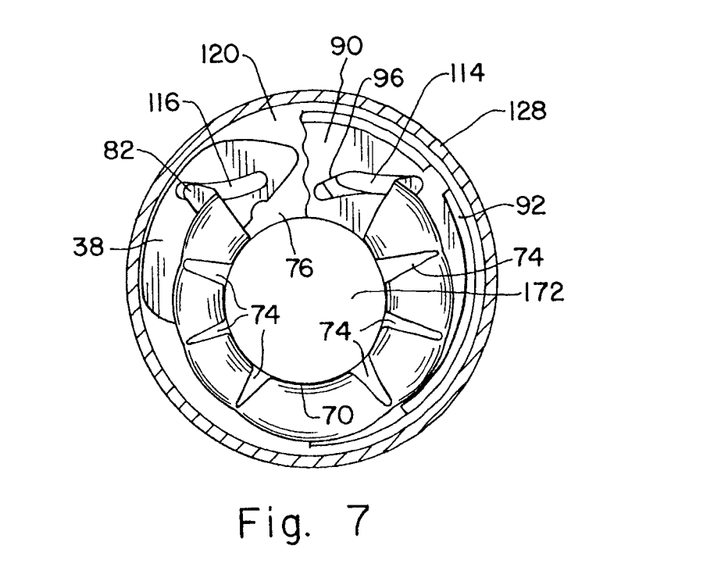
FIG. 7 is an end view, partially broken away, of the inlet neck assembly in the condition shown in FIG. 6, but with the refueling nozzle not shown to more clearly reveal structures of the inlet neck assembly.

FIGS. 6 and 7 illustrate a condition of assembly 20 when nozzle 190 has been inserted into actuator 32, but not fully into primary shutoff valve 24. Nozzle 190 has caused actuator 32 to reach maximum expansion, causing shutters 36, 38 to be pivoted from the blocking position in front of flapper door 144. The flapper door remains closed until contacted and moved by further insertion of nozzle 190.

Figure 8:
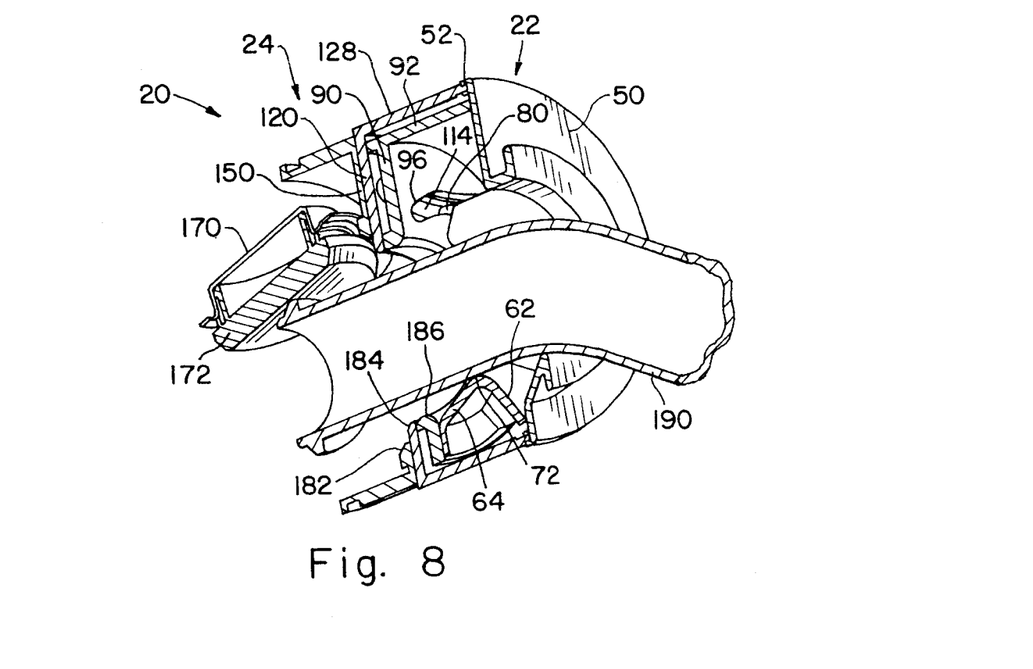
FIG. 8 is a cross-sectional view of the inlet neck assembly shown in the previous drawings, illustrating a condition during a refueling operation with full insertion of a refueling nozzle.
Figure 9:
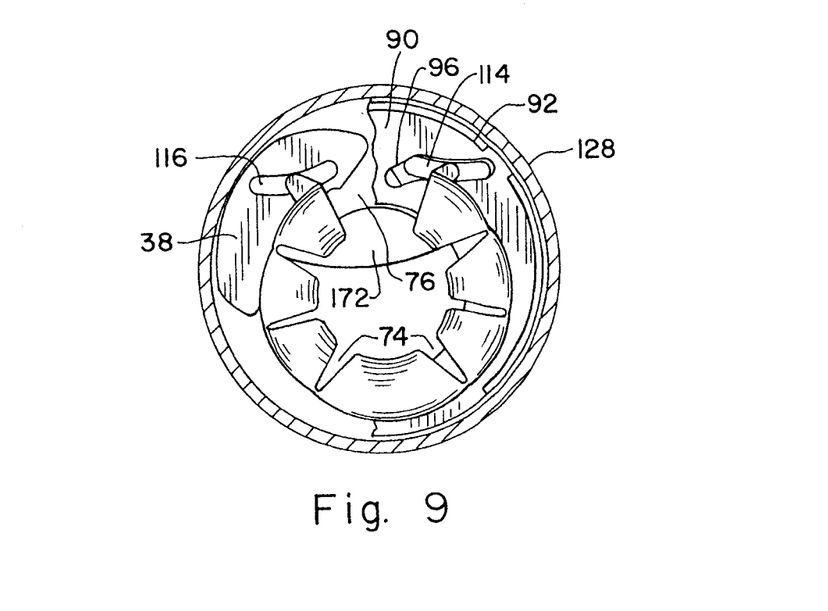
FIG. 9 is an end view, partially broken away, of the inlet neck assembly in the condition shown in FIG. 8, but with the refueling nozzle not shown to more clearly reveal structures of the inlet neck assembly.

FIGS. 8 and 9 illustrate a condition of assembly 20 when nozzle 190 has been inserted through mis-fuel inhibitor 22 to a fully inserted position in primary shutoff valve 24 for refueling to commence. Actuator 32 remains expanded, shutters 36, 38 remain pivoted to opened positions and flapper door 144 has been opened by the insertion of nozzle 190.

When refueling is completed, withdrawal of nozzle 190 results in flapper door 144 being urged closed by flapper door spring 148 after the end of nozzle 190 is withdrawn outwardly of access hole 152. As nozzle 190 is removed from actuator 32, C-shaped spring 84 urges constriction of the actuator, narrowing any gap along axial separation 76. As actuator 32 constricts, pins 80, 82 move toward one another, returning along lateral guide slots 96, 98. As the distal portions of pins 80, 82 move toward one another the pins also move along cam slots 114, 116 of first and second shutters 36, 38. The shutters are moved toward the closed position, again concealing or blocking flapper door 144.

Figure 10:
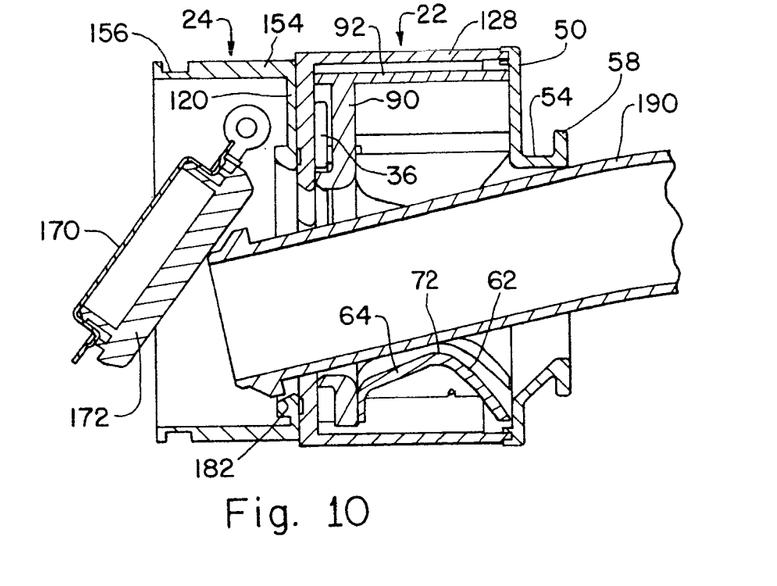
FIG. 10 is a cross-sectional view of the inlet neck assembly at the end of a refueling operation, as the refueling nozzle is being removed.
Figure 11:
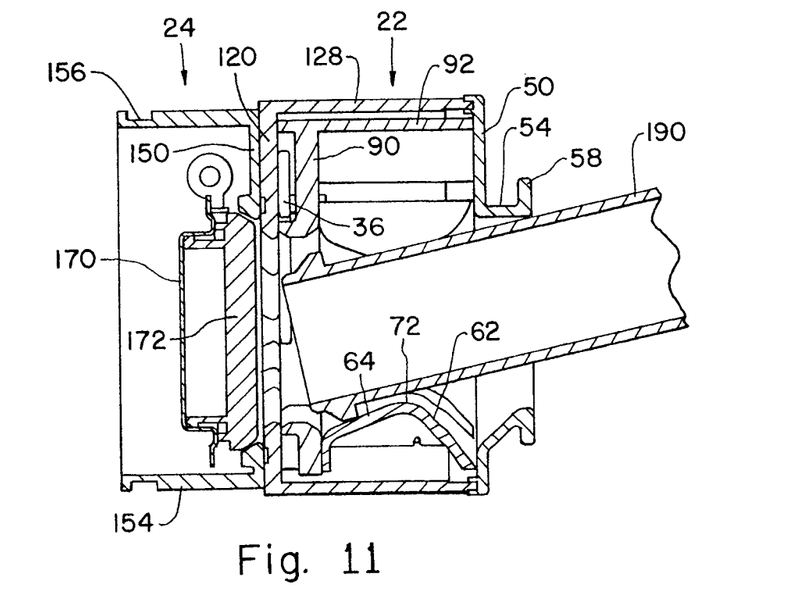
FIG. 11 is a cross-sectional view of the inlet neck assembly with the refueling nozzle further removed than as shown in FIG. 10.

FIGS. 10 and 11 illustrate conditions of assembly 20 when nozzle 190 is partially removed from primary shutoff valve 24 (FIG. 10) and when nozzle 190 has been fully removed from primary shutoff valve 24 but remains in mis-fuel inhibitor 22. The conditions of the various structures at stages of removal are the same as when the nozzle is in a corresponding position during nozzle insertion. FIGS. 10 and 11 illustrate that flapper door 144 rests against and follows the movement of the end of nozzle 190 as the nozzle is either inserted or withdrawn.

Accordingly, structure is provided to allow the insertion of nozzles having diameters at or above the required minimum diameter, while excluding nozzles having smaller diameters. The structure will not open to allow a smaller nozzle to enter even if force is applied against some, but not all of the segments 60. Lateral guide slots or channels 96, 98 of actuator inner housing 34 retain actuator pins 80, 82 and thereby shutters 36, 38 in their closed positions if force is applied generally against upper and lower segments 60 relative to the installed position as shown in the drawings. Force against upper segments 60 additionally causes actuator pins 80, 82 to engage against the ends of cam slots 114, 116, further holding shutters 36, 38 in closed positions. Force applied primarily against segments 60 to the left or right causes binding of one or the other actuator pin 80, 82 at the end of the respective lateral guide slot or channel 96 or 98 in which it is held. Movement of shutters 36, 38 requires that multidirectional forces be applied simultaneously against segments 60 all around actuator 32. The required multi-directional forces are applied when a nozzle of a diameter larger than narrowed opening 70 is inserted, but are not achieved if a nozzle smaller than narrowed opening 60 is inserted, even if the smaller nozzle is forced against some of the segments 60.

In the exemplary embodiment shown, the inlet path defined by the various openings through the outer cover, actuator, actuator inner housing and actuator outer housing as well as through the primary shutoff valve is not centered to accommodate a smaller overall package. However, it should be understood that the various openings can be centered along an axis of the assembly as well.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicle fuel system refueling inlet inhibitor for limiting fuel nozzle access by nozzle diameter, said inhibitor comprising:
a fuel inlet path defined by a plurality of openings;
first and second shutters at one of said openings having closed positions blocking passage of a refueling nozzle through said one of said openings and opened positions allowing entrance of the refueling nozzle through said one of said openings; and
an annular expandable actuator connected to said shutters by way of first and second pins for opening and closing said shutters together, said actuator being initiated so that said first and second pins move away from one another to open said shutters in a swinging movement generally perpendicular to said fluid inlet path upon insertion of a nozzle having a diameter of at least a predetermined minimum diameter.

2. The inhibitor of claim 1, said actuator having a plurality of peripherally connected segments, said segments defining a second one of said openings; and a pair of adjacent segments being separated from each other by an axial separation extending through said actuator from said second one of said openings.

3. The inhibitor of claim 2, said segments being truncated pyramids having axially angled outer and inner plates between radial plates.

4. The inhibitor of claim 3, radial plates of adjacent segments being spaced from each other.

5. The inhibitor of claim 4, including a spring connected to and at least partially encircling said actuator.

6. The inhibitor of claim 1, said actuator having a plurality of peripherally connected segments, said segments defining a second one of said openings; and a pair of adjacent segments being separated from each other by an axial separation extending through said actuator from said second one of said openings.

7. The inhibitor of claim 6, said first and second pins being disposed on segments on opposite sides of said axial separation.

8. The inhibitor of claim 6, said shutters each having a cam slot, and said first and second pins disposed in said cam slots.

9. The inhibitor of claim 8, including an inner plate between said actuator and said shutters, and guide slots in said inner plate through which said first and second pins extend, said guide slots configured to allow movement and separation of said first and second pins.

10. The inhibitor of claim 9, said first and second pins being disposed on segments on opposite sides of said axial separation.

11. The inhibitor of claim 10, including a spring connected to and at least partially encircling said actuator.

12. The inhibitor of claim 10, said segments being truncated pyramids having axially angled outer and inner plates between radial plates.

13. The inhibitor of claim 12, radial plates of adjacent segments being spaced from each other.

14. A vehicle fuel system inlet neck assembly, comprising:
an inhibitor for limiting fuel nozzle access by nozzle diameter, said inhibitor having an inlet path defined by a plurality of openings;
a primary shutoff valve having an access hole positioned with respect to said inhibitor to receive a refueling nozzle inserted along said inlet path, and a flapper door closing said access hole; and
said inhibitor including:
an actuator having peripherally connected segments defining one of said openings, said one of said openings having a diameter smaller than a minimum acceptable nozzle diameter and larger than a maximum unacceptable nozzle diameter;
a pair of adjacent segments separated by an axial separation extending through said actuator from said one of said openings;
said one of said openings expanding under force exerted by insertion of a nozzle of at least the minimum acceptable nozzle diameter, expansion of said one of said openings causing movement of at least some of said segments;
said actuator having first and second pins extending from said actuator toward said primary shutoff valve, said pins disposed on segments that are moved by expansion of said one of said openings;
an inner plate having lateral guide slots through which said first and second pins movably extend;
first and second shutters on an opposite side of said inner plate from said actuator, said first and second shutters blocking access to said flapper door in closed positions of said shutters and exposing said flapper door in opened positions of said shutters; and
cam slots in said first and second shutters receiving distal end portions of said first and second pins.

15. The inlet neck assembly of claim 14, including a spring connected to and at least partially encircling said actuator and biasing said actuator to a constricted position of said one of said openings.

16. The inlet neck assembly of claim 15, including an outer housing and an outer cover containing said actuator, said inner plate and said first and second shutters, said outer housing and said outer cover each having an opening of said openings defining said inlet path.

17. The inlet neck assembly of claim 16, said first and second shutters having pivotal projections secured rotatably to said outer housing.

18. The inlet neck assembly of claim 17, said first and second pins disposed on segments on opposite sides of said axial separation.

19. A vehicle fuel system refueling inlet inhibitor for limiting fuel nozzle access by nozzle diameter, said inhibitor comprising:
an actuator having peripherally connected segments defining an opening having a diameter smaller than a minimum acceptable nozzle diameter and larger than a maximum unacceptable nozzle diameter;
a pair of adjacent segments separated by an axial separation extending through said actuator from said opening;
said opening expanding under force exerted by insertion of a nozzle of at least the minimum acceptable diameter and causing movement of at least some of said segments;
first and second pins extending from segments that are moved by expansion of said opening;
an inner plate having lateral guide slots through which said first and second pins extend;
first and second shutters on an opposite side of said inner plate from said actuator, said first and second shutters having closed positions adjacent each other and opened positions in which said shutters are swung away from each other; and
cam slots in said first and second shutters receiving distal end portions of said first and second pins, said cam slots positioned beneath said lateral guide slots in the insertion direction of the nozzle.

20. The inhibitor of claim 19, said first and second pins disposed on segments on opposite sides of said axial separation.

\* \* \* \* \*